US008912479B2

(12) United States Patent
Milne et al.

(10) Patent No.: US 8,912,479 B2
(45) Date of Patent: Dec. 16, 2014

(54) SENSING SYSTEM FOR A MEDIA PRESENTER

(75) Inventors: Douglas L. Milne, Dundee (GB); Naill Leonard, Dundee (GB); Christopher Wylie, Dundee (GB)

(73) Assignee: NCR Corporation, Duluth, GA (US)

( * ) Notice: Subject to any disclaimer, the term of this patent is extended or adjusted under 35 U.S.C. 154(b) by 969 days.

(21) Appl. No.: 12/976,276

(22) Filed: Dec. 22, 2010

(65) Prior Publication Data

US 2012/0160860 A1 Jun. 28, 2012

(51) Int. Cl.

*G06M 7/00* (2006.01)
*G01N 21/86* (2006.01)
*G07D 11/00* (2006.01)
*B65H 31/30* (2006.01)

(52) U.S. Cl.

CPC ...... *G07D 11/0018* (2013.01); *B65H 2553/412* (2013.01); *B65H 2511/20* (2013.01); *B65H 2408/13* (2013.01); *B65H 31/3063* (2013.01); *B65H 2553/24* (2013.01); *B65H 2701/1912* (2013.01); *G07D 11/0081* (2013.01)

USPC ...................................... 250/221; 250/559.01

(58) Field of Classification Search

USPC ......... 250/221, 559.01, 559.29, 559.3; 221/9, 221/1, 92; 271/220, 1, 2, 3.01–3.13, 3.14, 271/3.15, 3.17, 8.1, 10.02–10.03, 271/265.01–265.04; 235/485, 475, 379; 356/429, 71; 399/361, 370; 382/135

See application file for complete search history.

(56) References Cited

U.S. PATENT DOCUMENTS 7,920,302 B2 * 4/2011 Yoshioka et al. ............. 358/474
2005/0056693 A1 * 3/2005 Yokoi et al. .................. 235/379

* cited by examiner

*Primary Examiner* — Pascal M Bui Pho
(74) *Attorney, Agent, or Firm* — Paul W. Martin

(57) ABSTRACT

A media presenter is described that includes a carriage moveable forwards and backwards along a linear presenter track between a first purge position, a stacking position, and a present position. The media presenter includes a sensing system that comprises: an inductive sensor; a resonant target mounted on the moveable carriage for co-operating with the inductive sensor to provide positioning information about the target relative to the inductive sensor; and an optical sensor mounted on the moveable carriage in the vicinity of the presenter track. The sensing system further comprises: a first purge target having a first optical property and mounted on the presenter track in the vicinity of the first purge position; and a present target having a second optical property and mounted on the presenter track in the vicinity of the present position.

12 Claims, 9 Drawing Sheets

FIG. 6
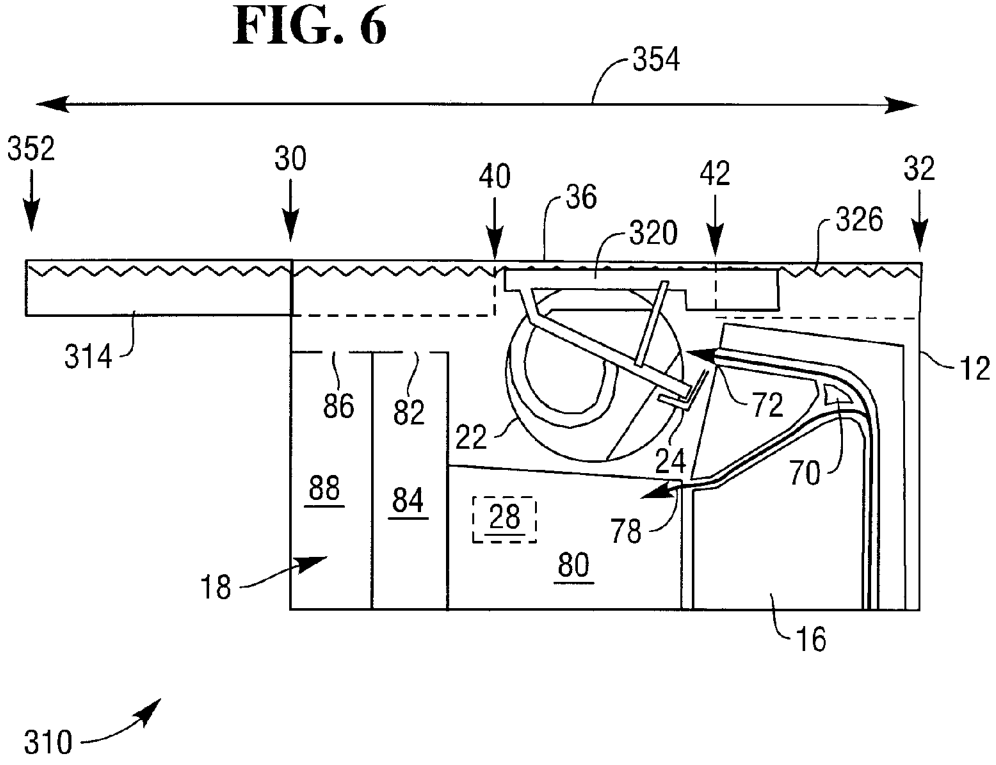
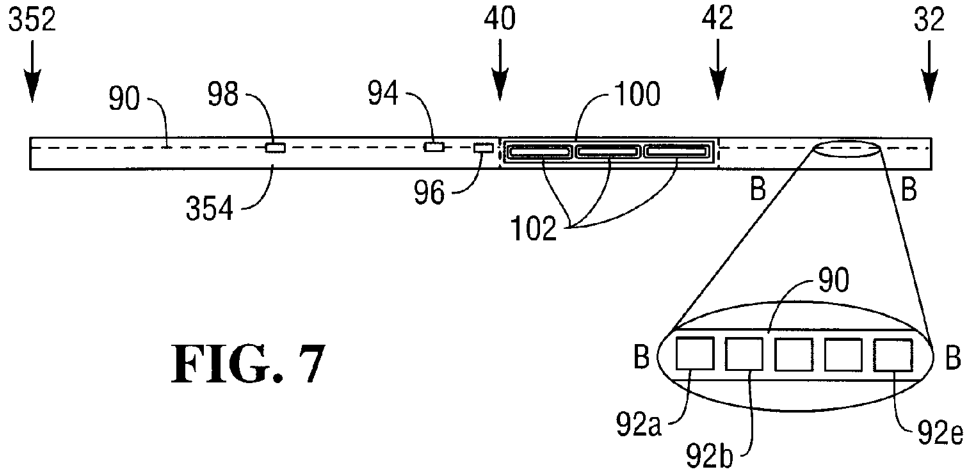
FIG. 7

REAR ACCESS PRESENTER

FRONT ACCESS PRESENTER

SENSING SYSTEM FOR A MEDIA PRESENTER

FIELD OF INVENTION

The present invention relates to a media presenter.

BACKGROUND OF INVENTION

A media presenter is used as part of a media dispenser. A media presenter is that part of the dispenser that presents media items (such as banknotes) to a customer. One common type of media dispenser is a bunch sheet media dispenser for dispensing a bunch (or stack) of media items in sheet form (such as banknotes, tickets, coupons, and the like).

A bunch media presenter is typically coupled to one or more media pick units. Each media pick unit picks individual media items from a media cassette (or a hopper) stored therein, and transports the picked media item to the media presenter for collating the media items into a bunch (for example, using a ballistic stacker or a stacking wheel), and then presenting the bunch of media items to a customer. If the customer does not remove the presented bunch, then the presenter withdraws the bunch and transports it to a purge bin.

Some media dispensers are front access, which means that media cassettes are inserted into the media dispenser at the same side of the media dispenser at which media items are dispensed to a customer. Other media dispensers are rear access, which means that media cassettes are inserted into a media dispenser at the opposite side of the media dispenser at which media items are dispensed to a customer.

It would be desirable to provide an improved media item presenter. It would also be desirable to provide a media item presenter that could be used with different lengths of presenter to fit into different sizes of self-service terminals. To enable such a system to operate reliably it would be desirable to have a sensing system that automatically detects the media item presenter configuration.

SUMMARY OF INVENTION

Accordingly, the invention generally provides methods, systems, apparatus, and software for a media presenter including a system for sensing the configuration of the media presenter.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a sensing system for a media presenter including a carriage moveable forwards and backwards along a linear presenter track between a first purge position, a stacking position, and a present position, the sensing system comprising:

an inductive sensor mounted on a central track portion and extending on either side of the stacking position so that a position of the moveable carriage can be ascertained as the moveable carriage approaches the stacking position from either the forward or backward direction;

a resonant target mounted on the moveable carriage for co-operating with the inductive sensor to provide positioning information about the target relative to the inductive sensor;

an optical sensor mounted on the moveable carriage in the vicinity of the presenter track;

a first purge target having a first optical property and mounted on the presenter track in the vicinity of the first purge position so that when the optical sensor detects the purge target the moveable carriage is aligned correctly for transferring media items carried thereby into an entrance of a purge bin; and a present target having a second optical property and mounted on the presenter track in the vicinity of the present position so that when the optical sensor detects the present target the moveable carriage is aligned correctly for presenting media items to a customer.

The sensing system may further comprise a second purge target having a third optical property and mounted on the presenter track in the vicinity of a second purge position so that when the optical sensor detects the second purge target the moveable carriage is aligned correctly for transferring media items carried thereby into another entrance of the purge bin.

The first purge position may be used for media items that have been presented to a customer but not removed (or not all removed) by the customer.

The second purge position may be used for media items that have never been presented to the customer. This may occur if there was a fault in creating the bunch of media items, or if there are insufficient media items to create the required bunch, or if multiple media items have been picked accidentally in a single operation.

The first, second, and third optical properties may relate to different transmission values for the purge targets and the present target. For example, the first optical property may comprise approximately one percent transmission, the second optical property may comprise five percent transmission, and the third optical property may comprise twenty percent transmission. Any convenient transmission percentages may be used.

The linear presenter track may extend from a customer delivery end of the media dispenser to a dispenser end of the media dispenser.

The linear presenter track may comprise the central track portion, a removable nose portion extending from the central track portion to the customer delivery end, and a removable end portion extending from the central track portion to the dispenser end.

The linear presenter track may be reconfigured by exchanging the positions of the removable nose portion and the removable end portion, thereby converting the media presenter between a front access presenter and a rear access presenter.

Multiple different removable nose portions may be provided, each having a different length, to enable the linear presenter track to be configured to fit different sizes of self-service terminal. For example, the distance between a dispenser and a fascia through which media items are dispensed may vary between self-service terminals.

The targets may comprise tab portions extending transversely from the presenter track. The tab portions may comprise individual tabs that can be inserted into and removed from a series of slots defined along the linear presenter track. This would allow, for example, the present tab to be mounted at the appropriate point of a removable nose portion. Alternatively, the tab portions may comprise a single continuous tab defining different optical properties along its length. The tab portions may comprise lengths of sections, each section having a uniform optical property for most of its length (except for a small area defining a preset position, such as a stacking position).

The optical sensor mounted on the moveable carriage may define a slot between a transmitter in the optical sensor and a detector in the optical sensor, where the slot is oriented transverse to the presenter track, and the optical sensor is mounted so that the tab portions pass through the slot as the carriage moves.

The moveable carriage may include a carriage body and a carriage plate, where the carriage plate is movable between an open position at which media items can be placed on the carriage plate, and a closed position for clamping media items between the carriage plate and the carriage body.

The media presenter may include a control board having a connector for coupling to a connection cable. The connection cable may have two connectors (a front access connector and a rear access connector) at a carriage connection end.

The moveable carriage may include a front access input and a rear access input configured different to the front access input, the front access input providing a complementary connector to the front access connector, and the rear access input providing a complementary connector to the rear access connector. This would ensure that only the front access connector could be used to connect to the front access input. Similarly, only the rear access connector could be used to connect to the rear access input.

The front access connector may ground an indicator signal from the control board; whereas, the rear access connector may not ground the indicator signal from the control board (which may be pulled high by a resistor instead).

This would provide an indicator signal that indicates the carriage type (low voltage indicates front access, high voltage indicates rear access). Alternatively, the front access may not ground the indicator signal, but the rear access may ground the indicator signal, in which case low voltage would indicate rear access. This enables the control board to detect whether a front access configuration is present or a rear access configuration is present, based on the state of an indicator signal.

According to a second aspect there is provided a method of sensing a configuration of a media presenter, where the media presenter includes a carriage moveable forwards and backwards along a linear presenter track, the method comprising:

detecting a signal on a control board from a cable coupled to either a front access connector on the carriage or a rear access connector on the carriage;

assigning an access orientation to the media presenter, where the access orientation is front access if the detected signal indicates that the cable is coupled to the front access connector, or rear access if the detected signal indicates that the cable is coupled to the rear access connector;

moving the carriage until a position marker is detected on the linear presenter track;

accessing stored configuration information associated with the assigned access orientation to retrieve position marker information;

identifying the position marker based on a property thereof and using the accessed configuration information;

moving the carriage to a stacking position marker, if the detected position marker is not the stacking position marker, using the accessed configuration information to ascertain a direction in which the carriage should be moved;

moving the carriage from the stacking position to a present position while measuring the distance traversed by the carriage; and updating the stored configuration information to include the distance between the present position and the stacking position.

The position markers may comprise: an inductive sensor mounted on the linear presenter track, and a plurality of tab portions extending transversely from the linear presenter track.

The inductive sensor may extend on either side of the stacking position so that a position of the moveable carriage can be ascertained as the moveable carriage approaches the stacking position from either the forward or backward direction.

The carriage may include a resonant target mounted thereon for co-operating with the inductive sensor to provide positioning information about the target relative to the inductive sensor.

The position markers may be detected by an optical sensor mounted on the moveable carriage in the vicinity of the presenter track.

The position markers may include: a first purge target; a second purge target, and a present target. These three targets may have different optical properties, such as different transmission coefficients.

According to a third aspect there is provided a method of sensing a configuration of a media presenter, where the media presenter includes a carriage moveable forwards and backwards along a linear presenter track, the method comprising:

using a sensor mounted on the carriage to detect a position at which the carriage ejects media items; and using a sensor mounted on the linear presenter track to detect a position at which the carriage is loaded with media items.

According to a fourth aspect there is provided a media dispenser including the sensing system of the first aspect.

According to a fifth aspect there is provided a self-service terminal including the media dispenser of the fourth aspect.

According to a sixth aspect there is provided a computer program comprising program instructions for implementing the second aspect.

According to a seventh aspect there is provided a computer program comprising program instructions for implementing the third aspect.

These computer programs may be embodied on a record medium (such as a computer memory) or conveyed on an electrical carrier.

According to an eighth aspect there is provided a method of configuring a media presenter, the method comprising: moving a carriage including a sensor along a presenter track; detecting a plurality of targets mounted on the presenter track; identifying each of the detected plurality of targets based on properties associated with the targets; and configuring the media presenter based on locations of the identified targets.

The method may include the further step of measuring a distance between two identified targets. These two identified targets may comprise a stacking position target and a present position target.

The step of configuring the media presenter based on locations of the identified targets may include updating configuration information with the measured distance between the two identified targets.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

BRIEF DESCRIPTION OF THE DRAWINGS

FIG. 6 is a simplified schematic diagram of a front access media item presenter including a sensing system according to another embodiment of the present invention;

FIG. 7 is a simplified schematic diagram of the presenter of FIG. 6, illustrating parts thereof (a linear presenter track, position markers, and a linear inductive sensor) in more detail;

Figure 1:
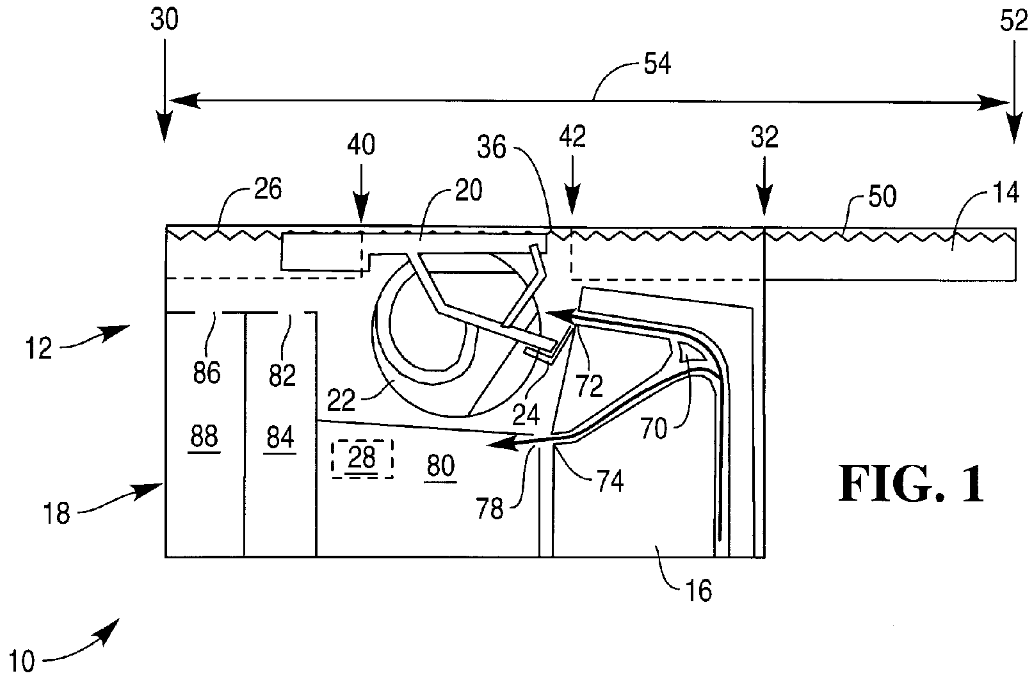
FIG. 1 is a simplified schematic diagram of a rear access media item presenter including a sensing system according to one embodiment of the present invention.

It should be appreciated that some of the drawings provided are based on computer renderings from which actual physical embodiments can be produced. As such, some of these drawings contain intricate details that are not essential for an understanding of these embodiments but will convey useful information to one of skill in the art. Therefore, not all parts shown in the drawings will be referenced specifically. Furthermore, to aid clarity and to avoid numerous leader lines from cluttering the drawings, not all reference numerals will be shown in all of the drawings. In addition, some of the features are removed from some views to further aid clarity.

DETAILED DESCRIPTION

Reference is first made to FIG. 1, which is a simplified schematic diagram of a reversible media item presenter 10 (in the form of a banknote presenter) including a sensing system according to one embodiment of the present invention.

The banknote presenter 10 comprises: a chassis 12, a removable nose 14, a banknote transport unit 16 for coupling to a pick unit (not shown) of a dispenser (not shown), a multi-compartment purge bin 18, a carriage 20 (shown at a stacking position in FIG. 1), a cam block 22 for opening and closing the carriage 20 by engaging with a cam follower (not shown) on the carriage 20, a registration device 24 for maintaining banknotes sprayed into the carriage 20 from the banknote transport unit 16 as a neat stack, a removable track 26, and a control board (shown by dotted line 28) for controlling the banknote presenter 10. Although not illustrated in the drawings, the control board 28 has a connector for coupling to a connection cable that has two connectors (a front access connector and a rear access connector) at a carriage connection end. The front access connector grounds an indicator signal from the control board 28; whereas, the rear access connector does not ground the indicator signal from the control board 28 (the indicator signal is pulled high by a resistor instead). Thus, the control board 28 can detect whether the banknote presenter 10 is configured for front access or for rear access based on the indicator signal.

The chassis 12 is formed from sheet metal. The chassis 12 extends from a handle end 30 to a pick end 32, and has a generally cuboid shape.

The chassis 12 includes a pair of central tracks 36 on an upper area thereof. Each of the central tracks 36 defines a linear, toothed, rack extending from a central handle end 40 to a central pick end 42.

The removable nose 14 also has a generally cuboid shape, and includes two mutually opposing nose tracks 50, each extending from the central pick end 42 to a presenting end 52 of the nose 14, and each aligning with a corresponding central track 36 to provide a continuous track on each side of the chassis 12.

The removable track 26 is located at the handle end 30 of the chassis 12. The distance between the handle end 30 and the central handle end 40 is approximately equal to the distance between the pick end 32 and the central pick end 42. This allows the removable track 26 to be located at either end of the chassis 12.

The removable track 26, the central track 36, and the nose track 50 are all linear, toothed racks that are linearly aligned and coupled so that they combine to provide a presenter track (illustrated by arrow 54) extending from the handle end 30 of the chassis 12 to the presenting end 52 of the nose 14.

The carriage 20 includes a pair of toothed drive cogs (not shown in FIG. 1) on either side thereof and mounted on opposite sides of a shaft. The toothed drive cogs mesh with the presenter tracks 54 on either side of the chassis 12 to enable the carriage 20 to be linearly moveable along the length of the presenter tracks 54. Although only one presenter track 54 is illustrated, the chassis 12 includes two parallel presenter tracks 54, each located on an opposite side of the chassis 12. The carriage 20 simultaneously engages with both presenter tracks 54 (each of two opposing sides of the carriage 20 engages with a different one of the presenter tracks 54). However, for clarity only one presenter track 54 is illustrated in FIG. 1.

The banknote transport unit 16 includes a diverter 70 which can route a banknote to either a carriage loading exit 72 (for loading the banknote onto the carriage 20) or a purge bin exit 74 (for loading the banknote into the purge bin 18).

The multi-compartment purge bin 18 has three entrances. The first entrance 78 receives banknotes from the banknote transport unit 16 into a pre-bunch divert compartment 80. The second entrance 82 receives a bunch of banknotes from the carriage 20 into a present retracted compartment 84. This is for storing banknote bunches that have been presented to a customer but were retracted because the customer did not remove the (or all of the) bunch. The third entrance 86 receives a bunch of banknotes from the carriage 20 into a pre-present retracted compartment 88. This is for storing banknote bunches that were purged prior to presenting to a customer.

When the carriage 20 is aligned so that a bunch of banknotes can be transported out of the carriage and into the second entrance 82 (for delivery to the present retracted compartment 84), then this is referred to as the present purge position (or the retract from present (RFP) position).

When the carriage 20 is aligned so that a bunch of banknotes can be transported out of the carriage and into the third entrance 86 (for delivery to the pre-present retracted compartment 88), then this is referred to as the pre-present purge position (or the reject position).

When the carriage 20 is aligned for delivering a bunch of banknotes to a customer then this is referred to as the present position.

Figure 2:
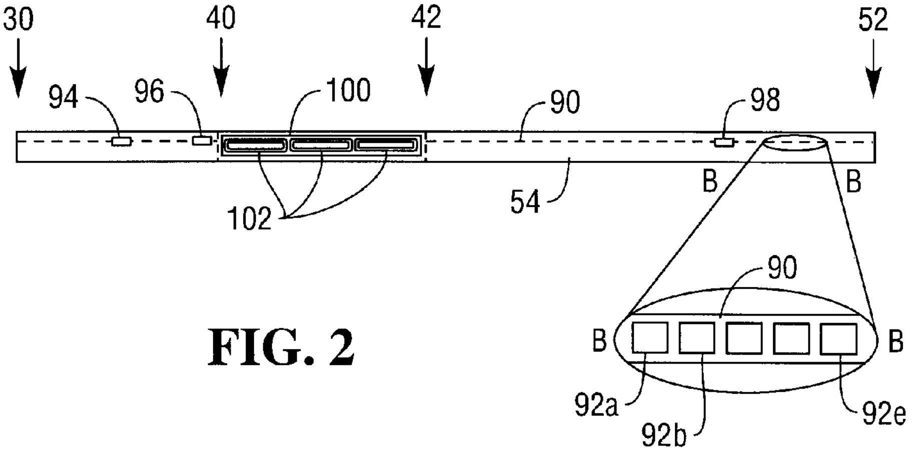
FIG. 2 is a simplified schematic diagram of the presenter of FIG. 1, illustrating parts thereof (a linear presenter track, position markers, and a linear inductive sensor) in more detail.

Reference will now also be made to FIG. 2, which is a simplified schematic diagram of the presenter track 54, illustrating components mounted thereon.

The presenter track 54 comprises a target mount 90 extending for substantially the entire length of the presenter track 54. The target mount 90 defines a linear series of apertures 92*a, b*, . . . (best seen in enlarged portion B-B of FIG. 2). Three optical targets 94,96,98 are removably located in the mount 90 as will be described below. The three optical targets 94,96,98 are in the form of tabs having an insertion end (not shown) dimensioned to provide an interference fit with the apertures 92.

An inductive sensor 100 is also mounted on the presenter track 54. The inductive sensor 100 includes conducting tracks 102 disposed as multiple spirals on the inductive sensor 100.

Figure 3:
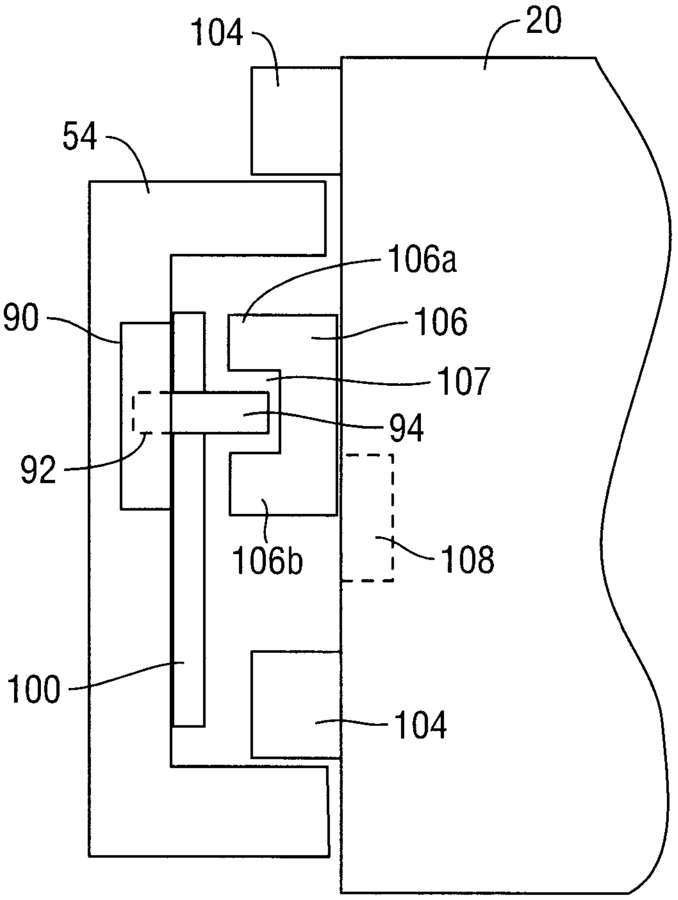
FIG. 3 is a simplified side view of part of the media item presenter of FIG. 1 illustrating part of a moveable carriage of the presenter engaging the linear presenter track.

Reference will now also be made to FIG. 3, which is a simplified side view of part of the moveable carriage 20 engaging the presenter track 54.

The moveable carriage 20 includes two toothed drive wheels 104 for engaging with the toothed rack defined by the linear presenter track 54. The moveable carriage 20 also includes an optical sensor 106 mounted to the side of the carriage 20. The optical sensor 106 defines a slot 107 between a transmitter arm 106*a* and a detector arm 106*b* in the optical sensor 106. The arms 106*a,b* are oriented transverse to the long direction of the presenter track 54, and the optical sensor 106 is mounted so that the optical targets 94,96,98 pass through the slot 107 as the carriage 20 moves along the linear presenter track 54.

A resonant target 108 (in the form of a resonator including a ferrite block) is also mounted on the carriage 20. This resonant target 108 is detected by the inductive sensor 100 as the resonant target 108 passes by.

In this embodiment, the inductive sensor 100 and target 108 are selected from the range of linear resonant inductive position sensors available from Cambridge Integrated Circuits Ltd, 21 Sedley Taylor Road, Cambridge, CB2 8PW, UK.

Referring again to FIG. 2, the three optical targets 94,96,98 shown therein are identical apart from their optical properties; in particular, their transmission properties.

The first optical target (or tab) 94 is referred to as the pre-present purge tab. This is located at the pre-present purge position. This tab 94 has a transmission of approximately 1%, so that only 1% of incident light is transmitted therethrough.

The second optical target (or tab) 96 is referred to as the present purge tab. This is located at the present purge position. This tab 96 has a transmission of approximately 5%, so that 5% of incident light is transmitted therethrough.

The third optical target (or tab) 98 is referred to as the present tab. This is located at the present position. This tab 98 has a transmission of approximately 20%, so that 20% of incident light is transmitted therethrough.

The optical sensor 106 is coupled to the control board 28, which stores optical target (tab) information indicating which optical target (based on transmittance detected by the optical sensor 106) corresponds to which position. This stored information, together with other information (such as the orientation of the presenter), is referred to herein as stored configuration information. The control board 28 includes software (not shown) that adapts to any changes in the transmittance through the optical targets 94,96,98 so that the software updates the stored values of transmission for the optical targets 94,96,98 as dirt and dust accumulates on the optical targets 94,96,98.

Figure 4A:
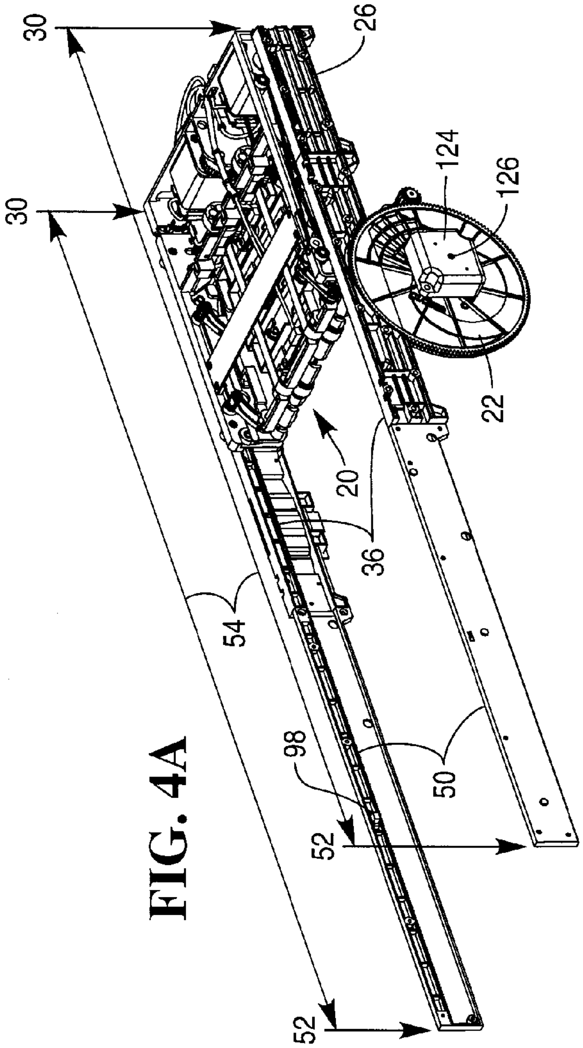
FIGS. 4A to 4D are diagrams illustrating the presenter track of FIG. 2 and other parts (a cam block, and a moveable carriage) of the media item presenter of FIG. 1, with the moveable carriage in four different positions.
Figure 4B:
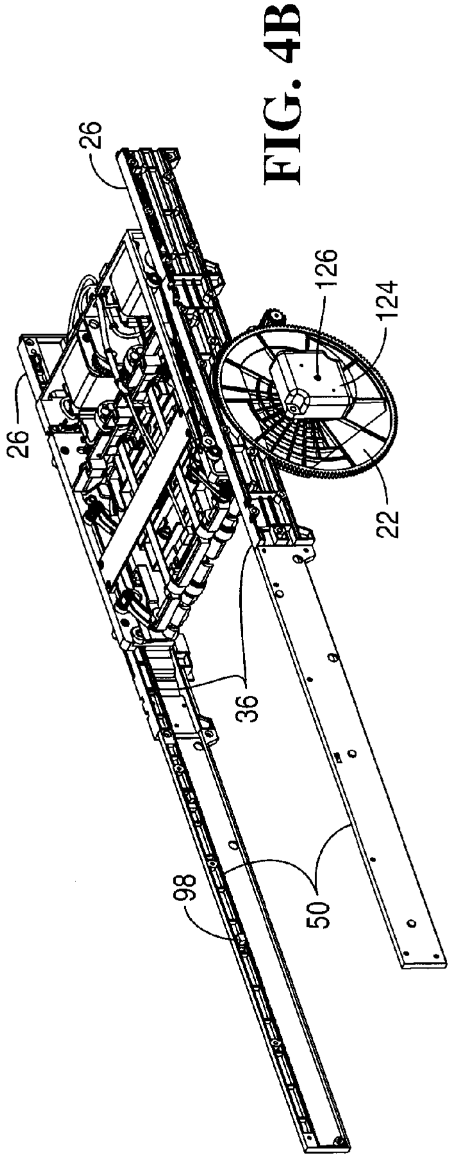
Figure 4C:
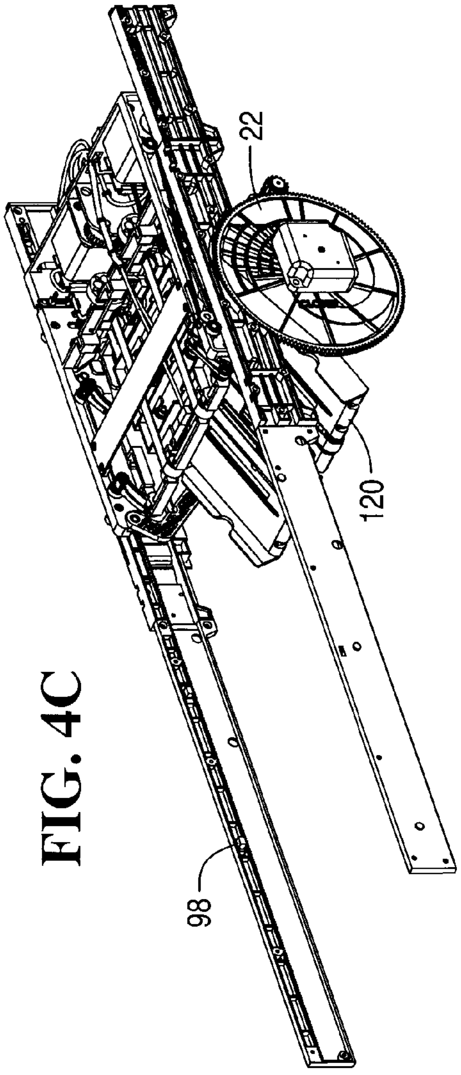
Figure 4D:
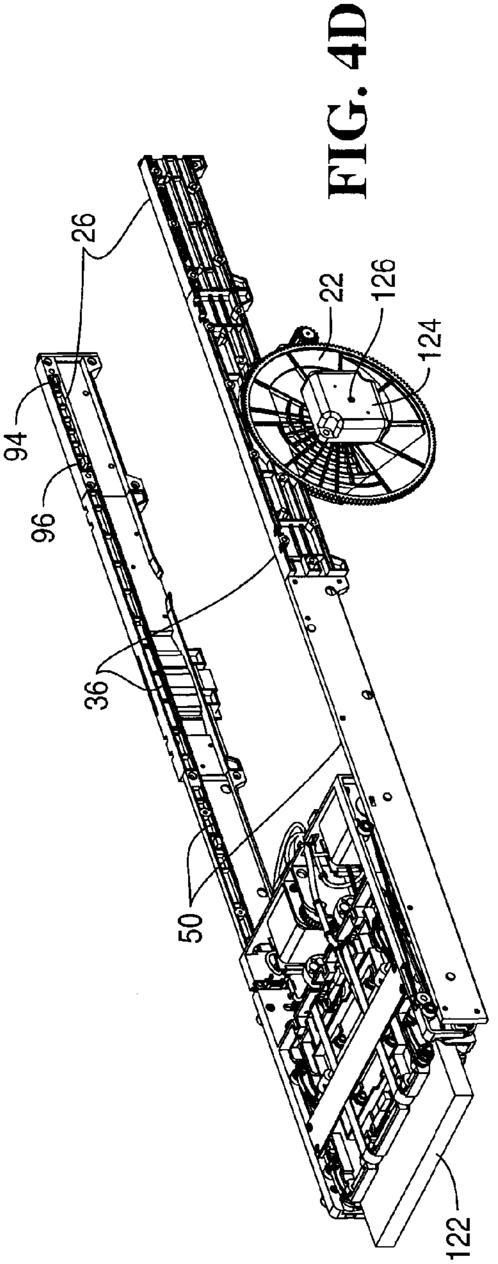

Reference will now also be made to FIGS. 4A to 4D, which illustrate the presenter track 54, the cam block 22, and the carriage 20, where the carriage is shown in four different positions. The four positions are: present purge position (FIG. 4A); stacking position, carriage closed (FIG. 4B); stacking position, carriage open (FIG. 4C); and present position (FIG. 4D). The non-present purge position is not illustrated in FIG. 4.

FIG. 4A shows the carriage 20 at the present purge position, which is used for transporting a bunch of banknotes into the purge bin 18, where the bunch of banknotes was presented to a customer but was not removed by the customer, as will be described in more detail below.

FIG. 4B shows the carriage 20 at the stacking position with the carriage 20 in the closed position. At the stacking position, the cam block 22 can be rotated by a cam block motor (not shown) until a carriage plate 120 (FIG. 4C) in the carriage 20 opens.

FIG. 4C also shows the carriage 20 at the stacking position with the carriage 20 in the open position, that is, the carriage plate 120 is lowered.

FIG. 4D shows the carriage 20 at the present position and a bunch of banknotes 122 being ejected from the carriage 20 for retrieval by a customer.

A cam block position sensor 124 is mounted on the cam block 22 and co-operates with another resonant target (not shown) mounted on a shaft 126 on which the cam block 22 is mounted. This enables the cam block position sensor 124 to sense the rotational position of the shaft 126, and thereby deduce the rotational position of the cam block 22. This may be needed in embodiments where the cam block 22 must be in a defined position for the carriage 20 to move along that part of the presenter track 54. For the following description it is assumed that the cam block 22 either does not need to be in a defined position or is already in that defined position.

In this embodiment, the cam block position sensor 124 and resonant target are selected from the range of rotary resonant inductive position sensors available from Cambridge Integrated Circuits Ltd, 21 Sedley Taylor Road, Cambridge, CB2 8PW, UK.

Figure 5A:
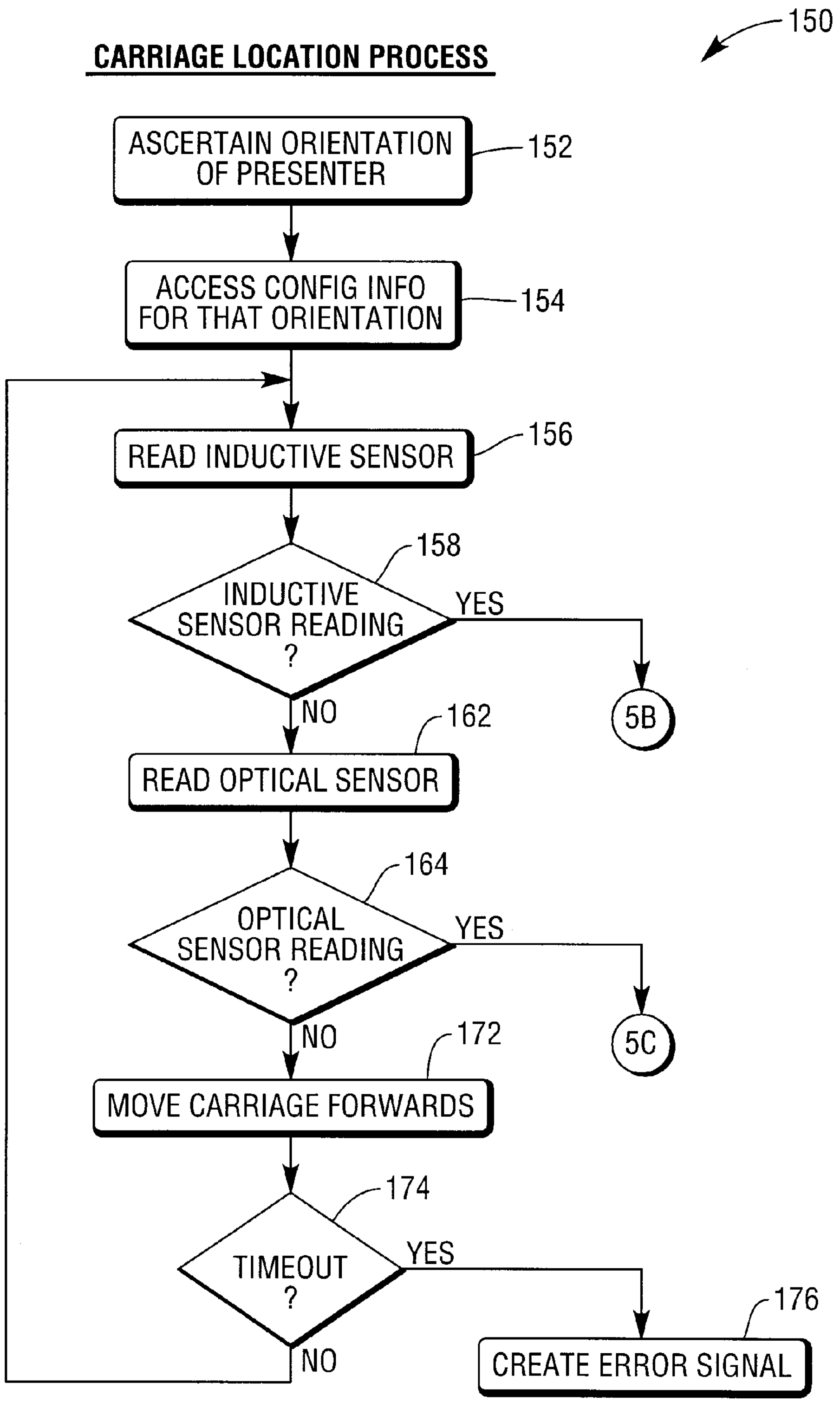
FIG. 5 is a flowchart (split into three charts A, B, and C for clarity) illustrating a process used to locate the position of the carriage of FIG. 3.

When the banknote presenter 10 is first turned on, the control board 28 must first ascertain where the carriage 20 is located. This is implemented using a process described with reference to FIG. 5, which is a flowchart illustrating the carriage location process 150.

Initially, the control board 28 ascertains the orientation of the banknote presenter 10 (that is, whether it is front access or rear access) (step 152). This is implemented by sensing the state of the indicator signal on the control board 28.

The control board 28 then accesses configuration information (stored in a memory (not shown) on the control board 28) for that orientation (step 154). The configuration information includes information about the targets that are mounted on the banknote presenter 10 (for example, the number of targets, the order of the targets on the presenter 10, the transmission properties of each target, and the like), information about the length of the removable nose 14 mounted on the chassis 12, and the like.

The control board 28 then attempts to read the inductive sensor 100 (step 156).

Figure 5B:
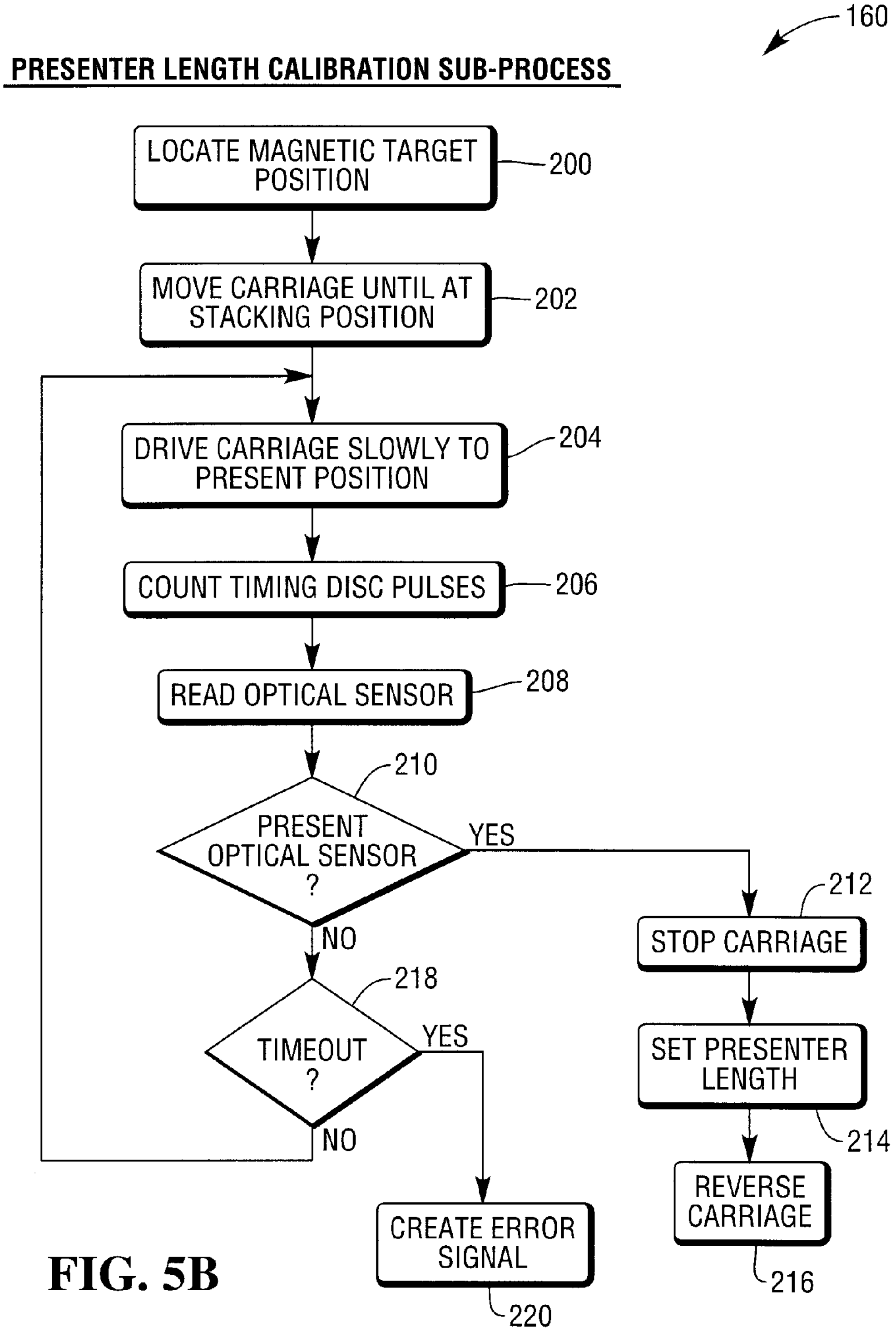

If the inductive sensor 100 provides a reading (indicating that the resonant target 108 is located near the inductive sensor 100) (step 158) then the process advances to the presenter length calibration sub-process 160 illustrated in FIG. 5B.

If the inductive sensor 100 does not provide a reading (step 158) then the control board 28 detects the output from the optical sensor 106 (step 162).

Figure 5C:
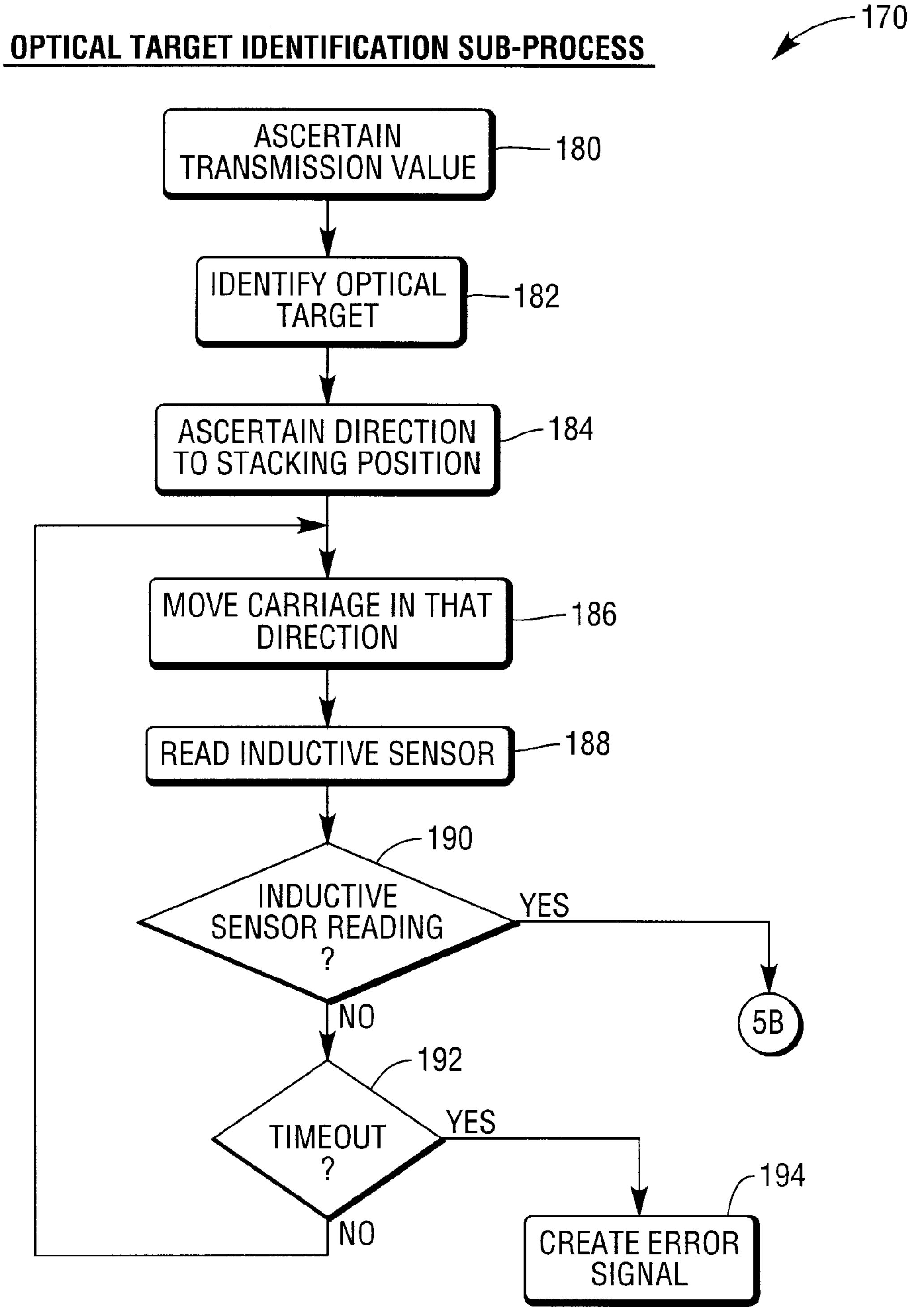

If the optical sensor 106 indicates that an optical target 94,96,98 is located between the arms 106*a,b* of the optical sensor 106 (step 164) then the process advances to the optical target identification sub-process 170 illustrated in FIG. 5C.

If the optical sensor 106 indicates that no optical target 94,96,98 is present (step 164) then the control board 28 moves the carriage 20 forwards at a very slow speed (step 172)

The control board 28 then ascertains if a timeout condition has occurred (step 174). In other words, if the carriage 20 has been driven for longer (or further) than would be required to reach the end of even the longest removable nose 14 that could be used on the banknote presenter 10 then an error has occurred. The control board 28 then creates an error signal (step 176). This error signal is transmitted to an ATM in which the banknote presenter 10 is installed.

If the timeout condition has not occurred (step 174) then the flow returns to step 156 where the inductive sensor 100 is read again. By this time the carriage 20 will have moved by a small amount so the optical sensor 106 may have reached one of the optical targets 94,96,98.

The optical target identification sub-process 170 illustrated in FIG. 5C will now be described.

Initially, the control board 28 ascertains the transmission value read by the optical sensor 106 (step 180).

This transmission value is compared with the various transmission values stored in the control board memory (not shown) as part of the configuration information (and accessed in step 154 above) to identify the optical target 94,96,98 that was read (step 182).

Once the optical target 94,96,98 is identified, the control board 28 can ascertain which direction (forward or reverse) to move the carriage 20 to reach the stacking position (step 184). The control board 28 then moves the carriage 20 in that direction (step 186).

The control board 28 then attempts to read the inductive sensor 100 (step 188).

If the inductive sensor 100 provides a reading (indicating that the resonant target 108 is located near the inductive sensor 100) (step 190) then the process advances to the presenter length calibration sub-process 160 illustrated in FIG. 5B.

If the inductive sensor 100 does not provide a reading (step 190) then the control board 28 ascertains if a timeout condition has occurred (step 192). The control board 28 then creates an error signal (step 194). This error signal is transmitted to an ATM in which the banknote presenter 10 is installed.

If the timeout condition has not occurred (step 192) then the control board 28 returns to step 186, where the control board 28 continues to move the carriage 20 towards the stacking position.

The presenter length calibration sub-process 160 illustrated in FIG. 5B will now be described.

Initially, the control board 28 locates the precise position of the resonant target 108 using the inductive sensor 100 (step 200). The control board 28 then moves the carriage 20 to the stacking position (step 202), if the carriage 20 is not already at the stacking position.

The control board 28 then drives the carriage 20 slowly towards the present position (step 204).

The control board 28 records the number of pulses generated by a timing disc (step 206). The timing disc pulses are pulses used to drive a stepper motor (not shown) that moves the carriage 20. By counting the timing disc pulses, the control board 28 can measure the distance travelled by the carriage 20.

The control board 28 attempts to read the optical sensor 106 (step 208).

If the optical sensor 106 indicates that the present optical target 98 is located between the arms 106*a,b* of the optical sensor 106 (step 210) then the control board 28 stops the carriage 20 (step 212) and updates the configuration information to set the presenter length based on the number of timing disc pulses counted (step 214). The control board 28 then reverses the carriage 20 to return it to the stacking position (step 216).

If the optical sensor 106 indicates that either no optical target, or a different optical target to the present target 98 (for example, the present purge target 96 or the pre-present purge target 94) is present (step 210), then the control board 28 ascertains if a timeout condition has occurred (step 218). The control board 28 then creates an error signal (step 220). This error signal is transmitted to an ATM in which the banknote presenter 10 is installed.

If the timeout condition has not occurred (step 218) then the control board 28 returns to step 204, where the carriage 20 continues to be moved towards the present position.

Once the carriage location process 150 has been completed, the control board 28 is aware of the orientation of the presenter, the position of each of the optical targets 94,96,98, and the length of the removable presenter nose 14, thereby enabling the banknote presenter 10 to operate correctly.

The carriage location process 150 may be repeated each time the banknote presenter 10 is powered up. This may occur after a power outage, or after the dispenser has been serviced. This ensures that if a different removable presenter nose 14 has been added, or if the optical targets 94,96,98 have been moved, then the control board 28 automatically learns about these changes without any human input being required.

Reference will now also be made to FIG. 6, which is a simplified schematic diagram of a front access media item presenter (in the form of a banknote presenter) 310 including a sensing system according to another embodiment of the present invention. The banknote presenter 310 is a re-configured version of the banknote presenter 10, so identical parts are shown with the same reference numerals.

The differences between the banknote presenter 10 and the banknote presenter 310 are as follows. Banknote presenter 310 includes a removable nose 314, a re-configured carriage 320 (shown at a stacking position in FIG. 6), a removable track 326, a new presenting end 352, and a new presenter track (illustrated by arrow 354) extending from the pick end 32 of the chassis 12 to the new presenting end 352 of the nose 314.

The removable nose 314 and removable track 326 are actually identical to the removable nose 14 and the removable track 26, but their positions have been switched to convert the presenter from rear access to front access.

FIG. 7 is a simplified schematic diagram of the presenter of FIG. 6, illustrating how the optical targets 94,96,98 have been removed from their position in the rear access presenter 10 and inserted into new positions for the front access presenter 310.

A third and fourth embodiment of the present invention will now be described. In these embodiments, instead of using three small optical targets that can be removed and inserted at any desired location on a target mount 90, three long sections of optical targets are mounted as a continuous length. Each of the three long sections has a different transmission property. The first length extends for the length of the removable track 26,326, the second length extends for the length of the central track 36, and the third length extends for the length of the presenter nose 14,314.

Figure 8:
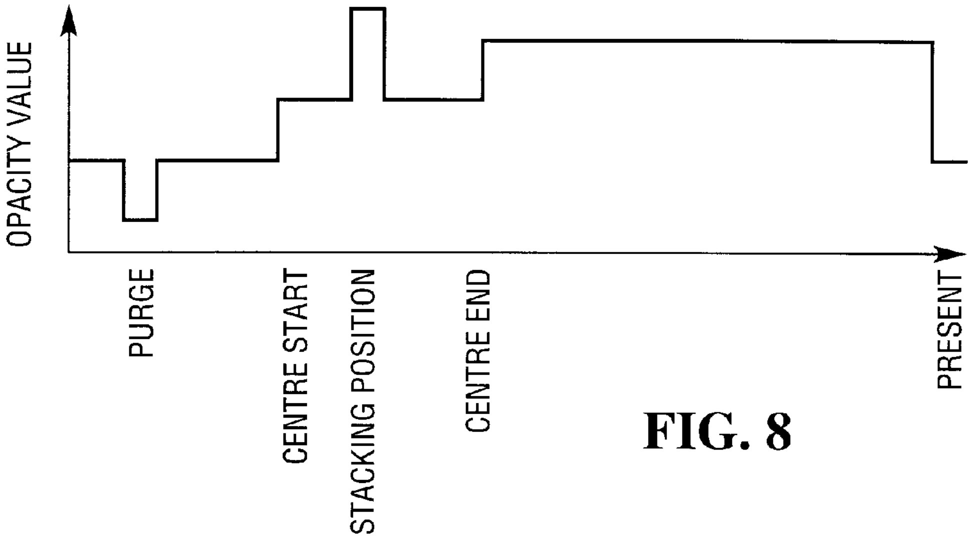
FIG. 8 is a graph illustrating the opacity (opposite of transmission) of three long sections of optical targets for a rear access presenter according to a third embodiment of the present invention.
Figure 9:
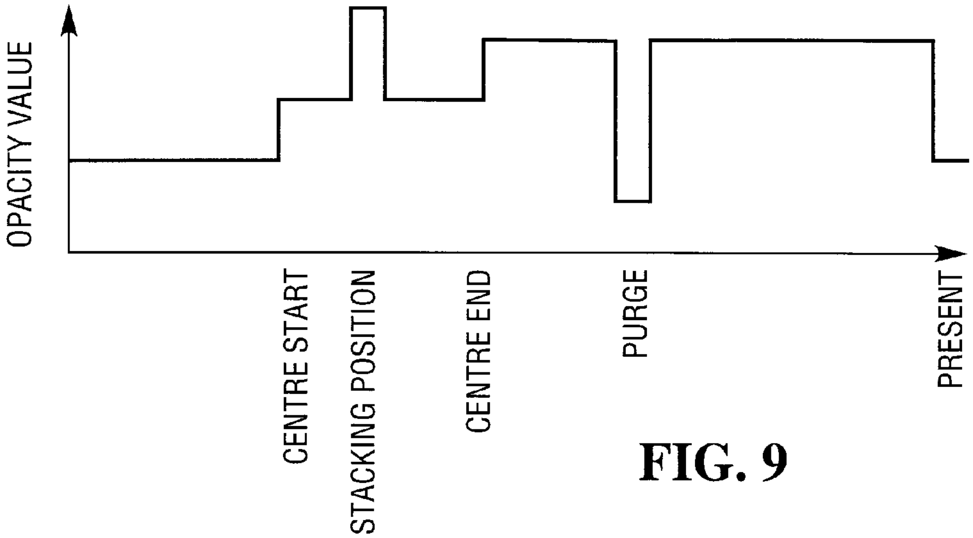
FIG. 9 is a graph illustrating the opacity of three long sections of optical targets for a front access presenter according to a fourth embodiment of the present invention.

Reference will now be made to FIGS. 8 and 9, which are graphs illustrating the opacity (the opposite of transmission) of the three long sections of optical targets for a rear access presenter 10 (FIG. 8) and a front access presenter 310 (FIG. 9).

As will be evident from the graphs, the central track section includes a low transmission (high opacity) point at the stacking position.

The rear access presenter 10 includes: a point of high transmission (low opacity) at a purge position (there is only one purge position shown) on the long section mounted on the removable track 26, and a point of medium transmission (medium opacity) at a present position on the long section mounted on the removable presenter nose 14.

Similarly, the front access presenter 310 includes: a point of high transmission (low opacity) at a purge position (there is only one purge position shown) on the long section mounted on the removable presenter nose 314, and a point of medium transmission (medium opacity) at a present position on the long section mounted on the removable presenter nose 314.

Since the control board 28 constantly reads the transmission (or opacity) of these long sections, it can deduce at which part of the banknote presenter 10,310 the carriage 20 is located.

If greater accuracy is required, then an inductive sensor may be used in the vicinity of the stacking position, in a similar way to the first and second embodiments described above.

Various modifications may be made to the above described embodiments within the scope of the invention, for example, in other embodiments, a different inductive sensor may be used than that described above.

In other embodiments, different transmission values may be used than those described above.

In other embodiments, optical properties other than transmission may be used, or non-optical properties may be used.

In other embodiments, where a cam block (such as cam block 22) is used that must be in a defined position, the position of the cam block 22 may be sensed and if the carriage 20 is not within the cam block portion then the cam block may be moved to the defined position prior to moving the carriage 20.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. A sensing system for a media presenter including a carriage moveable forwards and backwards along a linear presenter track between a first purge position, a stacking position, and a present position, the sensing system comprising:

an inductive sensor mounted on a central track portion and extending on either side of the stacking position so that a position of the moveable carriage can be ascertained as the moveable carriage approaches the stacking position from either the forward or backward direction;

a resonant target mounted on the moveable carriage for co-operating with the inductive sensor to provide positioning information about the target relative to the inductive sensor;

an optical sensor mounted on the moveable carriage in the vicinity of the presenter track;

a first purge target having a first optical property and mounted on the presenter track in the vicinity of the first purge position so that when the optical sensor detects the purge target the moveable carriage is aligned correctly for transferring media items carried thereby into an entrance of a purge bin; and a present target having a second optical property and mounted on the presenter track in the vicinity of the present position so that when the optical sensor detects the present target the moveable carriage is aligned correctly for presenting media items to a customer.

2. A sensing system according to claim 1, wherein the sensing system further comprises a second purge target having a third optical property and mounted on the presenter track in the vicinity of a second purge position so that when the optical sensor detects the second purge target the moveable carriage is aligned correctly for transferring media items carried thereby into a second entrance of the purge bin.

3. A sensing system according to claim 1, wherein the first purge position is used for media items that have been presented to a customer but not removed by the customer.

4. A sensing system according to claim 2, wherein the second purge position is used for media items that have never been presented to a customer.

5. A sensing system according to claim 2, wherein the first, second, and third optical properties relate to different transmission values for the purge targets and the present target.

6. A sensing system according to claim 2, wherein the linear presenter track extends from a customer delivery end of the media dispenser to a dispenser end of the media dispenser, and the linear presenter track comprises the central track portion, a removable nose portion extending from the central track portion to the customer delivery end, and a removable end portion extending from the central track portion to the dispenser end.

7. A sensing system according to claim 6, wherein the linear presenter track is reconfigurable by exchanging the positions of the removable nose portion and the removable end portion, thereby converting the media presenter between a front access presenter and a rear access presenter.

8. A sensing system according to claim 6, wherein the optical sensor mounted on the moveable carriage defines a slot between a transmitter in the optical sensor and a detector in the optical sensor, where the slot is oriented transverse to the presenter track, and the optical sensor is mounted so that the first purge target and the present target pass through the slot as the carriage moves.

9. A sensing system according to claim 6, wherein the media presenter includes a control board having a connector for coupling to a connection cable having a front access connector and a rear access connector at a carriage connection end.

10. A media dispenser including the sensing system of claim 1.

11. A method of sensing a configuration of a media presenter, where the media presenter includes a carriage moveable forwards and backwards along a linear presenter track, the method comprising:

detecting a signal on a control board from a cable coupled to either a front access connector on the carriage or a rear access connector on the carriage;

assigning an access orientation to the media presenter, where the access orientation is front access if the detected signal indicates that the cable is coupled to the front access connector, or rear access if the detected signal indicates that the cable is coupled to the rear access connector;

moving the carriage until a position marker is detected on the linear presenter track;

accessing stored configuration information associated with the assigned access orientation to retrieve position marker information;

using the accessed configuration information to identify the position marker based on a property thereof and;

moving the carriage to a stacking position marker, if the detected position marker is not the stacking position marker, using the accessed configuration information to ascertain a direction in which the carriage should be moved;

moving the carriage from the stacking position to a present position while measuring the distance traversed by the carriage; and updating the configuration information to include the distance between the present position and the stacking position.

12. A method of sensing a configuration of a media presenter according to claim 11, wherein the position markers comprises: an inductive sensor mounted on the linear presenter track, and a plurality of tab portions extending transversely from the linear presenter track.

* * * * *